3,477,015
VOLTAGE REGULATOR FOR MULTI-PHASE VARIABLE SPEED, VARIABLE FREQUENCY GENERATOR, PARTICULARLY FOR AUTOMOTIVE USE
Edgar Kuhn, Gerlingen, Germany, assignor to Robert Bosch G.m.b.H., Stuttgart, Germany, a limited-liability company of Germany
Filed Jan. 23, 1967, Ser. No. 611,033
Claims priority, application Germany, Feb. 25, 1966, B 85,965
Int. Cl. H02h 7/06
U.S. Cl. 322—24          8 Claims

ABSTRACT OF THE DISCLOSURE

Field current for a three phase automotive type generator is controlled, to maintain the voltage at the nominal level, by supplying the field coil through a paid of SCR's from two of the three phases; the third phase is used to derive a signal varying in amplitude with time, during any one cycle in synchronism with the frequency of the generator; the amplitude of this time-varying signal is compared with a reference and the firing point of the SCR's within any one cycle is controlled by coincidence of the reference with the varying amplitude of the time-varying signal obtained from the third phase.

---

Figure 1:
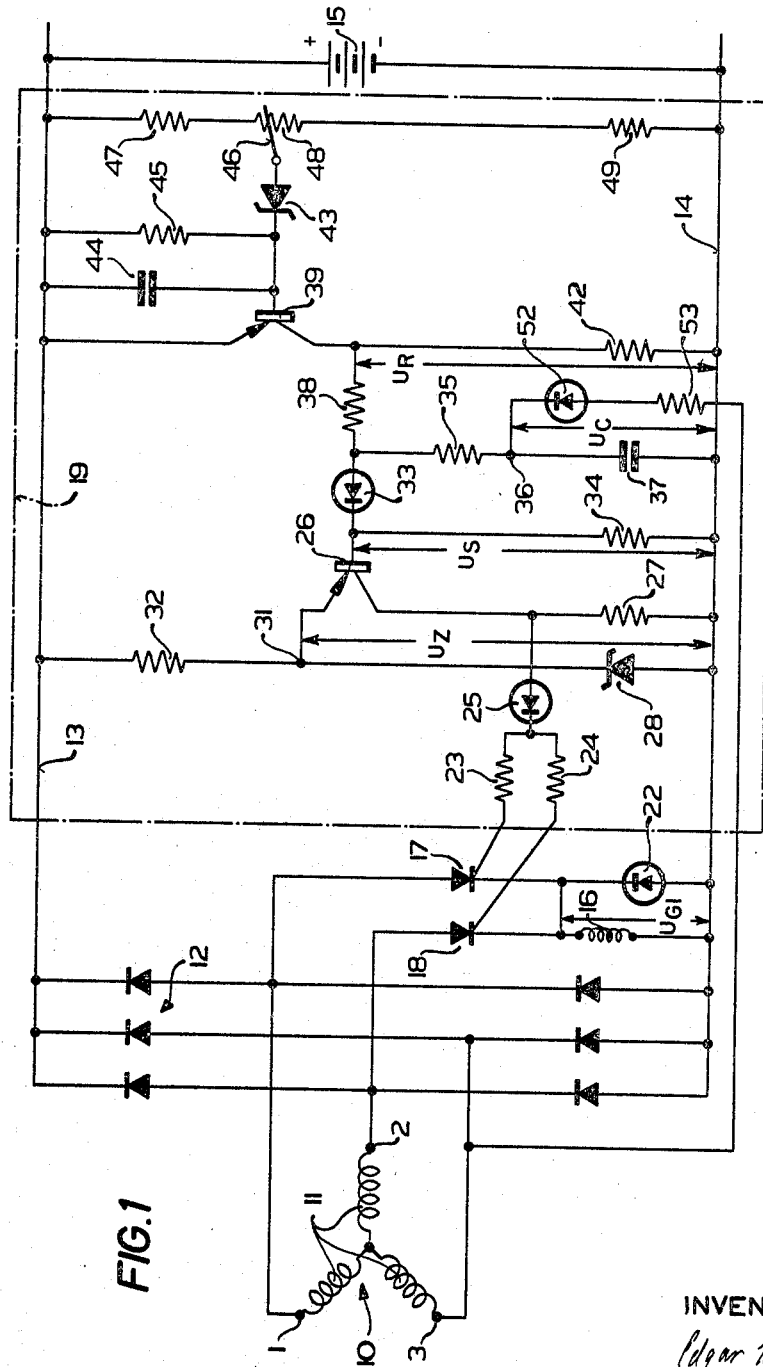

The present invention relates to a voltage regulator for a multi-phase variable speed, variable frequency generator, and more particularly to a voltage regulator for a three phase generator for use in motor vehicles.

Multi-phase generators, and particularly three phase generators, require a voltage regulator in order to maintain the voltage at the output of the alternator at a desired level. Since the speed of rotation of automotive engines, and thus of the alternator, varies widely, in some instances within a ratio of 20 to 1, and the load on the alternator likewise can vary within wide limits, an effective voltage regulator to control the output potential of the alternator is essential to obtain satisfactory operation with the usual floating battery. Accessories connected to the electrical supply in a motor vehicle often are quite sensitive to the voltage level supply; for example, automotive radios, mobile communication equipment such as used in taxis, and the like, require constant output potentials. When communication equipment is to be supplied from an automotive engine, three phase generators are often used, which may have a power output in the order of 0.5 to approximately 10 kw. A complicated regulator may be more expensive than the generator itself; a simple and effective solution to the problem of voltage regulation is thus desirable.

Regulators of this kind should be as small as possible in order to be mounted beneath the hood of a motor vehicle, where space is at a premium. Preferably, the regulator should be so small that it can be mounted directly to the housing of the generator, or can be combined therewith. This adds the further requirement that the number of components to be used in the regulator should be small. Yet, when the generator is fully excited, the current through its shunt field should be as continuous as possible and not intermittent in order to obtain efficient use of the field winding. Thus, a solution to the problem utilizing only a single control rectifier and operating from a single phase of a three phase generator is often not desirable.

Vibratory-type regulators have been known for many years; transistor-type voltage regulators have recently become available. Such regulators usually operate as on-off regulators, that is they either completely interrupt the field current or permit it to flow with full force. Such regulators suffice for most requirements, although their effectiveness is not the best. As silicon controlled rectifiers, and other type of controlled rectifiers are becoming more available, it has been proposed to utilize controlled rectifiers in the circuit of the field winding and to control the phase angle of the current supplied to the field winding, with respect to any one of the phases of the generator. An example of such a phase angle rectifier control is disclosed in U.S. Patent 3,121,836; it has been found, however, that such a controller either requires a comparatively large number of elements, or is quite restricted in its tolerance of variation in frequency, that is it requires a substantially constant feed of the generator. Regulators, as disclosed in the aforementioned patent, are primarily used in high-quality motor-generator drives, such as for example for paper machinery or rolling mills, and for large installations as, for example, in aircraft; they were not primarily designed for automotive use.

It is an object of the present invention to provide a voltage regulator for automotive use which is efficient in operation, small in size, and utilizes but few components, and further permits efficient utilization of the field winding of the generator it is to control.

Briefly, in accordance with the present invention, the field winding of a multi-phase generator is controlled by SCR's. At least one phase is left free, and does not provide current for the field, under control of the SCR. This particular phase is utilized as a timing control with respect to the phasing of the on-off time of the SCR's, so that the SCR's will fire during each cycle of the generator, at a time determined by comparison of the output voltage, with a reference (which may be established by a Zener diode) at a phase angle, that is at a period of time when a certain predetermined relationship (such as coincidence) exists between a time-varying signal, controlled by the remaining phase, and the deviation of the output from a reference norm.

The present invention permits control of all SCR's, connected to their respective phases, although not all may fire under high-voltage, that is no load operating conditions. When, however, the load placed on the generator is large, both rectifiers will be controlled to supply field current to the winding practically throughout the entire positive half cycle of their respective phases, thus assuring efficient utilization of the field coil.

Figure 2:
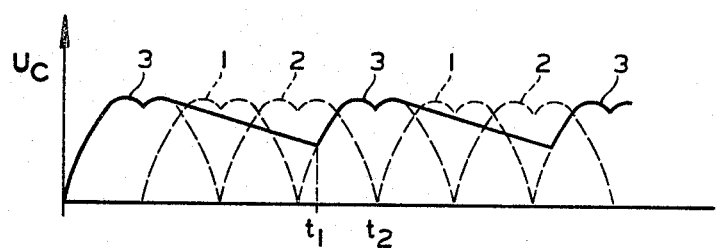
Figure 3:
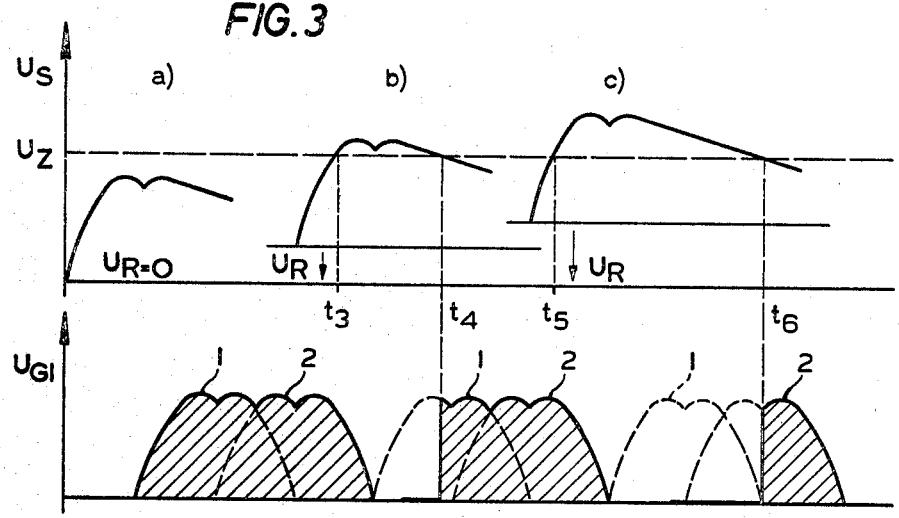

The structure, organization and operation of the invention will now be described more specifically in the following detailed description with reference to the accompanying drawings, in which:

FIG. 1 is a circuit diagram of a voltage regulator for a three-phase generator; and FIGS. 2 and 3 are diagrams illustrating the operation of the circuit in accordance with FIG. 1.

Referring now to the drawings: FIG. 1 illustrates, schematically, a three phase generator 10 having three star connected phase windings 11 with terminals 1, 2, 3. A full wave rectifier 12 is connected to the output of three phase generator 10 and supplies the vehicle over a positive bus 13, a negative bus 14, and a battery 15 floating thereon. Loads, such as lights, appliances, communication equipment and the like, then can be connected to buses 13, 14.

The three phase generator has a shunt field 16; the excitation field current is supplied by a pair of controlled rectifiers, such as silicon controlled rectifiers 17, 18, the firing phase angle of which is determined by the output potential existing between buses 13, 14. The two SCR's receive control pulses from a single voltage regulator, generally shown within the dash-dotted lines 19. Both SCR's 17, 18, are controlled by a phase angle control as will appear in detail below.

Field winding 16 has one terminal connected to negative bus 14, and the other to the cathodes of the SCR's 17, 18. Parallel to field winding 16 is a bypass diode 22 to bypass voltage peaks upon change in current through field winding 16, and to maintain current through the field coil 16 when the rectifiers 17, 18 block.

Rectifiers 17, 18 are connected to a pair of sequential phases of generator 10; the anode of rectifier 17 is connected to terminal 1, and the anode of rectifier 18 to terminal 2 of windings 11. The control electrode of SCR 17 is connected over a balancing resistor 23, similar to balancing resistor 24 connecting the control electrode of SCR 18, in parallel, to a protective diode 25, the anode of which is connected with a collector of a p-n-p transistor 26. Transisor 26 operates as a comparator as will appear below. Protective diode 25 is so chosen that it prevents excessive current in the control circuit of rectifiers 17, 18 in negative direction.

The collector of transistor 26 is connected to negative bus 14 over collector resistance 27. A Zener diode 28, acting as a source of reference potential, has its anode likewise connected to negative bus 14, its cathode to a junction 31 which is connected over a resistance 32 to positive bus 13. As seen in FIG. 1, a constant potential $U_Z$ will exist across Zener diode 28, that is between junction 31 and negative bus 14, the magnitude of which is governed by the characteristics of Zener diode 28.

Junction 31 is connected to the emitter of transistor 26. The base of transistor 26 is connected to the cathode of a diode 33 and over a resistance 34 to the negative bus 14. The anode of diode 33 is connected over a first adding resistor 35 to a junction 36. A condenser 37 connects junction 36 to negative bus 14. The anode of diode 33 is further connected to a second adding resistor 38, and over resistor 38 with a collector of a p-n-p transistor 39 which, in turn, is connected over its collector resistance 42 with negative bus 14. Resistance 42 will have a potential $u_R$ thereacross, which will increase as the potential between the buses 13, 14 increases above a desired value. Potential $u_R$ is therefore controlled by the deviation of the output potential from desired value.

The emitter of p-n-p transistor 39 is connected to positive bus 13. Its base is connected directly to the cathode of a Zener diode 43 as well as over a parallel capacitance-resistance network consisting of condenser 44 and resistance 45, which R-C network is connected to the positive bus 13. The anode of Zener diode 43 is connected to the tap 46 of a voltage divider across buses 13, 14. The voltage divider is formed of three resistances, 47, 48, 49.

One of the phases of generator 10, that is the one which does not have an SCR connected thereto, terminal 3 in FIG. 1, is connected over a resistance 53 and a diode 52 to junction 36.

The operation of the circuit according to FIG. 1 can best be described in connection with the diagrams of FIGS. 2 and 3. So long as the output voltage of generator 10 is insufficient, that is so long as the value is below the desired one, the potential at tap 46 will be negative to such an extent with respect to that of the positive line 13, that the Zener diode 43 will be blocked and no base current will be permitted to flow in transistor 39. Thus, there will be no current through collector resistance 42 and potential $u_R$ thereacross will be zero.

When the output potential of the generator rises to the desired value, then the potential at tap point 46 will become sufficiently negative with respect to that of the positive line 13 so that Zener diode 43 will become conductive, thus permitting a base current to flow in transistor 39. Transistor 39 becomes conductive and a collector current will flow through collector resistance 42, since the current through Zener diode 43 will increase generally proportional to deviation from the desired potential after it has become conductive. Resistance 53 and rectifier 52 supply a potential to junction 36 which is similar to that shown in FIG. 2, at the left side, and illustrated as curve 3. This curve is representative of the potential between one phase and the negative bus 14 of the full wave rectifier 12, connected to the three-phase generator. The crest of each positive impulse of the potential of curve 3 charges condenser 37. This condenser discharges when the phase voltage decreases again. It discharges over the first adding resistance 35, diode 33, and resistance 34, and the potential across the condenser 37 will then be indicated by the full line in FIG. 2 and shown as voltage $u_c$. As seen in FIG. 2, from the point $t_1$, potential $u_c$ is determined by the value of the phase potential of phase 3. Time $t_1$ is ahead of point of time $t_2$ in which the potential of phase 2 becomes zero. In the period of time between $t_1$ and $t_2$, no control of the rectifiers is possible. This period of time is very short, however, and does not interfere with efficient utilization of the field winding.

The first adding resistance 35 and the second adding resistance 38 add potentials $u_R$ and $u_c$. The added voltage is applied over diode 33 to the base of transistor 26. The emitter of this transistor is connected to junction 31 and thus to a reference potential $U_Z$, across Zener diode 28. When the base potential of transistor 26 becomes more negative than the potential at point 31, the transistor becomes conductive and a voltage drop will arise across collector resistance 27, so that the collector itself will be approximately at the potential 31. This potential will be positive with respect to that applied to the cathodes of the pair of SCR's 17, 18, so that a positive firing potential is applied to the SCR's over the balancing resistances 23, 24, and the protective diode 25. Thus, the SCR's will fire as soon as their anodes become positive with respect to their cathodes. This is illustrated in FIG. 3 under column (a). It is here assumed that the potential between buses 13 and 14 is below the desired value, so that resistance 42 (FIG. 1) does not have any potential $u_R$ thereacross, so that the base of transistor 26 has, as a composite potential $u_s$ thereacross only the value $u_c$ normally across the condenser. In this case transistor 26 is conductive at all times, as seen in FIG. 3 under (a), since the composite potential $u_s$ at all times is smaller than the potential $U_Z$ at junction 31. SCR's 17 and 18, connected to phases 1 and 2 respectively, will fire sequentially and full field current will be supplied to field coil 16 and the output potential of generator 10 will increase.

If the output potential increases beyond the desired value, even if only slightly, the relationship indicated in FIG. 3 under (b) will obtain. Potential $u_R$ across resistance 42 will be small. The composite potential $u_s$ will now be formed of the potential $u_R$ across resistor 42 as well as the potential $u_c$ across condenser 37. As seen in FIG. 3b, the composite potential will increase from point $t_3$ above the value of potential $U_Z$, so that after the point of time $t_3$, transistor 26 functioning as a comparator, that is comparing the potentials $u_s$ and $U_Z$, will block. Control electrodes of SCR's 17, 18 will be at the potential of negative bus 14 after the point of time $t_3$, and the two SCR's will remain blocked. At period of time $t_4$, the composite potential $u_s$ will be smaller than potential $U_Z$ at junction 31 and only at this point of time will the transistor 26 become conductive, so that control electrodes of SCR's 17, 18 will receive a positive control impulse and first rectifier 17 will become conductive, since a high potential will exist between its anode and cathode; as the potential increases across SCR 18, this SCR will likewise conduct.

As clearly apparent from FIG. 3b, a small excitation current will flow through shunt field 16, so that the output potential between buses 13, 14 will not increase further.

Let it be assumed that a load across buses 13, 14 is switched off. Potential $u_R$ will increase and the composite potential $u_s$ increases further. This situation is illustrated in FIG. 3 in column (c). Even at point $t_5$, transistor 26 will not yet conduct, so that the control electrodes of SCR's 17, 18, will not receive a control potential. Transistor 26 only will become conductive at point $t_6$ in order to control the electrodes of both SCR's 17, 18. However, the anode of SCR 17 already has a potential which is negative with respect to that of the cathode so that this SCR will not conduct further, but only SCR 18 will be controlled to conduct field current. This is clearly apparent from FIG. 3c and the average excitation current will decrease, so that the potential between buses 13, 14 decreases rapidly.

Three-phase alternators for automotive use may operate at fairly high frequencies, that is up to 1,000 Hz. Control is thus extremely rapid, and the output potential is even, resulting in high control effectiveness. Very few components are necessary; a pair of transistors suffice in order to control a pair of silicon controlled rectifiers 17, 18 by phase angle control. The remaining components can readily be packaged in small space and be assembled from readily available elements.

I claim:
1. A voltage regulator for a three-phase variable speed, variable frequency generator (10) having a field winding (16), comprising
   a pair of controlled rectifiers (17, 18), the controlled rectifiers (17, 18) of said pair being connected to temporally sequential phases (phase 1 and 2) of said generator, and further to supply said field with field current,
   means (43, 39, 42) to sense the amplitude of the output potential of said generator and delivering a control signal ($u_R$) in accordance with said output potential;
   and a firing circuit (19) for said controlled rectifiers (17, 18) and connected to provide firing potential thereto in synchronism with the frequency of the generator, said firing circuit being connected (37, 52, 35) to the phase preceding (phase 3) said sequential phases (FIGS. 1 and 2) and having said control signal applied thereto and delivering a firing potential to said controlled rectifiers (17, 18) in accordance with the amplitude of said control signal ($u_R$) and in synchronism ($u_c$) with the frequency of said generator as determined by said preceding phase (phase 3).

2. Regulator as claimed in claim 1 including a source of reference potential (28–$U_Z$); a control switch (26) differentially connected (31, 33) to said source of reference signal (28–$U_Z$) and said control potential ($u_R$–38, 42) and delivering a firing potential to said controlled rectifiers (17, 18) when, during any one cycle of the generator (10) as determined by the connection (37, 52, 53) to said preceding phase (phase 3) a predetermined relationship of said control signal ($u_R$) and the source of reference potential (28–$U_Z$) occurs.

3. Regulator as claimed in claim 1 including timing signal generator means (53, 52, 37) connected to said preceding phase (phase 3) delivering a potential gradually changing in synchronism with said preceding phase during any one cycle, and rapidly assuming its initial value at the beginning of a next cycle to deliver a time-varying signal ($u_c$); an adder circuit (35, 38, 33) having one input connected to said control signal ($u_R$–42) and another input connected to the timing signal generator means ($u_c$) and providing a composite signal ($u_s$) output having both control potential ($u_R$) and time-varying signal ($u_c$) components; a source of reference potential (28–$U_Z$); and a control switch (26) differentially connected to said source of reference potential (28–$U_Z$) and the output of said adder circuit ($u_s$; 38, 35, 33) and delivering a firing potential to said controlled rectifier (17, 18) during any one cycle of said generator as determined by the time-varying signal ($u_c$) upon coincidence between said composite signal ($u_s$) and said reference potential ($U_Z$).

4. Regulator as claimed in claim 1 including a comparator (26); a source of reference potential (28–$U_Z$); an adder circuit (33, 35, 38) connected to add said control signal ($u_R$) representative of the output potential of the generator and a potential ($u_c$) representative of said preceding phase (phase 3) and delivering a composite signal ($u_s$); said comparator (26) being connected to compare said reference potential ($U_Z$) and said composite signal ($u_s$) controlling said firing circuit for said controlled rectifier (17, 18).

5. Regulator as claimed in claim 4 wherein said comparator (26) is a transistor; one electrode (emitter) of said transistor being connected to said source of reference potential (28) and another electrode (base) being connected to said adder circuit (33, 35, 38) applying said composite potential ($u_s$), whereby the transistor will supply a control pulse only when the composite potential ($u_s$) is less than the reference potential ($U_Z$).

6. Regulator as claimed in claim 4 wherein a rectifier (52) is connected to said preceding phase (phase 3); a condenser (37) and a condenser discharge resistor (34) are connected to said rectifier to supply a time-varying potential ($u_c$) in synchronism with said preceding phase (phase 3), said time-varying potential being applied as an input (35) to said adder circuit (33, 35, 38).

7. Regulator as claimed in claim 1 wherein the firing circuit is connected to the control electrodes of both said controlled rectifiers (17, 18) in parallel, whereby a single regulator will control the firing of all field rectifiers of the three-phase generator.

8. Regulator as claimed in claim 1 wherein said firing circuit includes means (52, 37, 34) deriving a time-varying potential ($u_c$) from one phase of said generator having a predetermined amplitude-time relationship and extending over a complete cycle of the generator; means adding (36, 38, 33) said time-varying potential ($u_c$) to said control signal ($u_R$) to derive a time-varying composite signal ($u_s$); a source of reference potential ($U_Z$–28); a comparator (26) comparing said composite signal ($u_s$) and said reference potential ($U_Z$); said comparator (26) being connected to the control electrodes of both said controlled rectifiers (17, 18) in parallel, to cause conduction of said controlled rectifiers upon coincidence upon said reference potential ($U_Z$) and said time-varying composite potential ($u_s$).

References Cited
UNITED STATES PATENTS 3,226,626　12/1965　Moore _____ 322—28
3,121,836　2/1964　Rosenberry _____ 322—24

ORIS L. RADER, Primary Examiner

H. HUBERFELD, Assistant Examiner

U.S. Cl. X.R.
322—28, 32, 70, 73